United States Patent [19]

Camphausen

[11] 4,077,700
[45] Mar. 7, 1978

[54] WAVEGUIDE ADDRESSING AND MODULATING METHOD AND APPARATUS

[75] Inventor: Don L. Camphausen, Fairport, N.Y.

[73] Assignee: Xerox Corporation, Stamford, Conn.

[21] Appl. No.: 745,277

[22] Filed: Nov. 26, 1976

[51] Int. Cl.² ............... G02B 5/14; H01L 79/78
[52] U.S. Cl. .................. 350/96.13; 350/96.34; 350/331; 357/24; 365/112; 365/183
[58] Field of Search ......... 350/96 WG, 160 R; 340/173 LM; 357/24

[56] References Cited

U.S. PATENT DOCUMENTS

| 3,701,122 | 10/1972 | Geusic et al. | 340/173 C |
| 3,838,908 | 10/1974 | Channin | 350/96 WG |
| 3,906,543 | 9/1975 | Smith et al. | 357/24 |

Primary Examiner—John K. Corbin
Assistant Examiner—Stewart Levy
Attorney, Agent, or Firm—James J. Ralabate; Eugene O. Palazzo; Max J. Kenemore

[57] ABSTRACT

Waveguides having light propagating therethrough are positioned between a common electrode and individual electrodes arranged along a charge-coupled device. The waveguides are of a type which modulate the propagating light responsive to an electric field. The charge-coupled device is activated to place charges at selected ones of the individual electrodes, creating a field across the waveguide by which light propagating through the waveguide is modulated.

4 Claims, 4 Drawing Figures

WAVEGUIDE ADDRESSING AND MODULATING METHOD AND APPARATUS

BACKGROUND OF THE INVENTION

This invention relates generally to integrated optics and, more particularly, to addressing arrangements for optical modulators and to methods of addressing optical waveguides for modulation.

Integrated optics has assumed a major role in information handling, communications and data processing systems. It is attractive because of the wide inherent bandwidth of optical devices and because of the many specialized features of optical waveguides.

Optical data links can be made to be smaller, cheaper and more reliable than their conventional counterparts. They are less susceptible to information degradation from electromagnetic interference, vibration, temperature changes and crosstalk. Where secrecy in communications is important, integrated optics offer the important advantages of electrical isolation and increased communications security.

In some integrated optics applications it is sometimes necessary or desirable to use a plurality of optical waveguides. A typical example of such a use is in the line-by-line addressing of a display device by an array of parallel optical waveguides.

In such applications it is usually necessary to modulate the light propagating through selected ones of the plurality of optical waveguides. A simple and effective method and apparatus for selectively addressing and modulating selected members of a plurality of optical waveguides are desirable.

Methods and devices for modulating light propagating through optical waveguides are known. Examples of such methods and devices are found in copending commonly assigned applications Ser. No. 621,312, filed Oct. 10, 1975, and 710,484, filed Aug. 2, 1976 now U.S. Pat. No. 4,050,027.

These applications disclose the modulation of light propagating through an elastomeric waveguide by changing the cross-sectional shape of the elastomer.

It has long been known to modulate light propagating through a liquid crystal waveguide by creating a field across the waveguide. This sort of waveguide modulation is disclosed, for example, in U.S. Pat. No. 3,838,908. That patent and copending, commonly assigned United States application Serial No. 542,786, filed Jan. 21, 1975, now U.S. Pat. No. 3,989,355, show examples of the complex matrix addressing systems normally used to modulate light propagating through liquid crystal materials.

Modulation of individual ones of a parallel array of waveguides by means of an electrical field is shown in U.S. Pat. No. 3,841,733. A common electrode is placed on one side of the waveguides and a separate individual electrode is placed on the opposite side of each waveguide. However, separate electrical connections must be made to each of the individual electrodes. The individual electrodes are separately and individually addressed. A less complex addressing means is desirable.

SUMMARY OF THE INVENTION

It is therefore an object of this invention to furnish a device for modulating light propagating through separate ones of a plurality of optical waveguides.

It is another object of this invention to supply a simple addressing means for controlling modulation of light propagating through various ones of a plurality of optical waveguides.

It is a further object of this invention to make available a method for modulating light propagating through various ones of a plurality of optical waveguides.

It is also an object of this invention to overcome the diadvantages of the prior art.

These and other objects are achieved, generally speaking, by a method for individually modulating light propagating through a plurality of individual waveguides when the waveguides are formed from a material which modulates propagating light responsive to an electrical field. The method comprises positioning each of the individual waveguides between a common electrode and an individual electrode of a charge-coupled device.

The charge-coupled device is then operated to establish fields between selected ones of the individual electrodes and the common electrode. The light propagating in the waveguides in the fields thus established is modulated.

A device for performing this method comprises a common electrode and a plurality of individually optical waveguides having light propagating therethrough arranged adjacent to the common electrode. A charge-coupled device is positioned to contact the individual waveguides with an individual electrode opposite the common electrode.

A control means operates the charge-coupled device to place a charge at selected ones of the individual electrodes. An electrical field is established between each of the selected ones of the individual electrodes and the common electrode. The light propagating through waveguides in the fields is modulated.

BRIEF DESCRIPTION OF THE DRAWINGS

The invention will now be described in greater detail with reference to the drawings in which.

DETAILED DESCRIPTION

Figure 1:
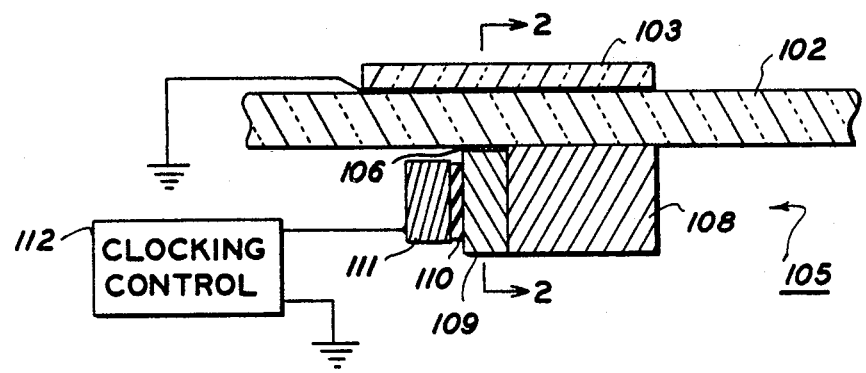
FIG. 1 is a greatly enlarged cross-sectional view showing, schematically, the arrangement of the charge-coupled device, the waveguide and the common electrode in the present invention.

Referring more specifically to FIG. 1, there is shown an apparatus for addressing and modulating light propagating through an optical waveguide 102. FIG. 1 is substantially a cross-section of FIG. 2 along lines 1—1.

Waveguide 102 is arranged adjacent to common electrode 103. Charge-coupled device 105 is positioned to contact waveguide 102 on the side opposite common electrode 103.

Any suitable material can be used to form waveguide 102. Typically, waveguides 102 are formed from liquid crystal materials or from deformable elastomers. The use of such materials will be described in greater detail with reference to FIGS. 2 and 3.

Common electrode 103 can be made from any suitable conductive material. Conductive metal foils and conductive layers furnish suitable common electrodes. One typical common electrode is NESA glass, commercially available from Pittsburgh Plate Glass, which comprises a tin oxide coating on glass. Another suitable common electrode is glass having a conductive layer of silver coated thereon.

Charge-coupled devices (CCDs) are well known, and any suitable such device is useful in the present invention. Charge-coupled devices transfer a packet of mobile electric charge stored within a semiconductor element along the element responsive to manipulation by external voltages.

The typical CCD 105 shown in FIG. 1 comprises a p-type silicon semiconductor strip 108 contacting n-type silicon semiconductor strip 109 which is adjacent insulating layer 110. On the side of insulating layer 110 opposite semiconductor strip 109 is clocking electrode 111. Electrode 111 is one of many such electrodes arranged serially along the insulating layer 110. The individual electrodes are electrically connected to positive and negative voltages in such a way that every second or third electrode in the row is connected to the same voltage supply. That is, every second or third electrode can be given a positive or negative potential at the same time.

The electrodes are made positive or negative in a periodic wave form or "clock" voltage supplied by clocking control 112. Such a voltage creates in the electrodes a moving pattern of electrons and holes which in turn move corresponding packets of holes and electrons along semiconductor layer 109 in a matching wave.

Any suitable clocking control may be used to cause a packet of charge to arise in strip 109 and to "clock" the packet along strip 109 by controlling electrode 111 and the adjacent electrodes. Such clocking controls are often part of commercially available CCDs. A typical example in the Model 121 Fairchild CCD Array, commercially available from Fairchild Semiconductor, Mountain View, Ca. The array is available with a driver and scanner. The use of such an array in the present invention is explained in greater detail in connection with Example I, below.

In FIG. 1, packets of charge are created in strip 109 and clocked along the strip by electrodes such as electrode 111 as directed by the clock control. The packet of charge is moved a determinable distance within a determinable length of time by a given number of cycles of the wave form clock. The packet of charge is thus positioned at any desired point along the length of the semiconductor strip 109.

The charge packets move quickly along strip 109. In the present invention, the charge is not in the vicinity of any particular waveguide sufficiently long enough to have an effect on the light transmissive properties of the waveguide until the clock is stopped. When the clock is stopped, the charge packet is stopped adjacent the waveguide which it is intended to modulate.

Separate individual electrodes 106 are located along the strip 109. Electrode 106 contacts waveguide 102. Whenever a waveguide 102 is sought to be made light-blocking, a charge packet is clocked to electrode 106 adjacent that waveguide 102. A field is created between the individual electrode 106 and common electrode 103 so that waveguide 102 in the field is made light scattering.

Figure 2:
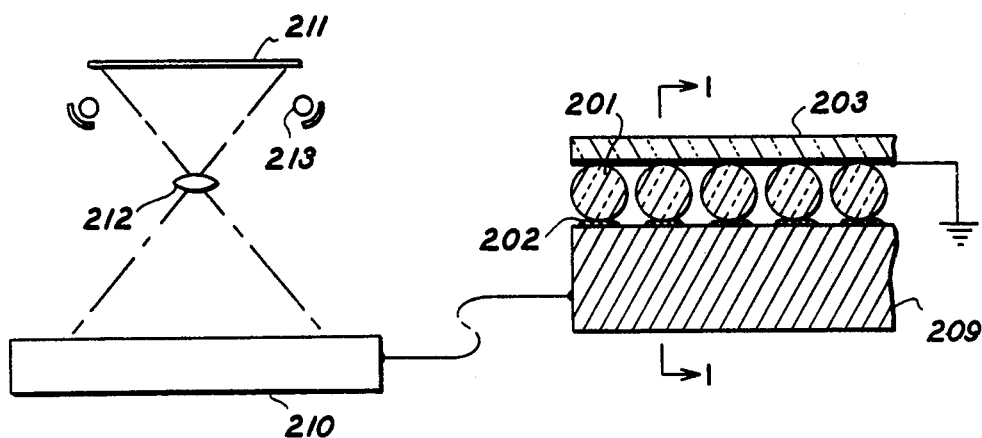
FIG. 2 is a cross-sectional view along 2—2 of FIG. 1 showing, schematically, the present invention wherein the optical waveguide is an elastomer and showing an optical scanner as driving the charge-coupled device.

Referring more specifically to FIG. 2, there is shown the device of FIG. 1 along lines 2—2 thereof. Waveguides 201 are made from a deformable elastomer material and individual electrodes 202 are placed between waveguides 201 and semiconductor strip 209 which corresponds to strip 109 in FIG. 1. Contacting the opposite side of waveguides 201 is grounded common electrode 203. The CCD of which strip 209 is a part is driven by CCD scanning driver 210 to move charges to the desired electrodes 202 at appropriate times.

The modulation of light propagating through elastomeric waveguides of a given cross-section is disclosed in the copending and commonly assigned U.S. patent application Ser. No. 621,312, filed Oct. 10, 1975. That application discloses the modulation of propagating light by the physical deformation of the waveguide. The physical deformation occurs as a result of the common attraction between electrodes placed on either side of the waveguide.

Elastomer waveguide 201 is preferably formed of a polymeric elastomer which has a greater index of refraction than the support substrate or the grounded common electrode 203. The elastomer should be one that is capable of being easily deformed when exposed to a force, such as an electric field.

A wide variety of elastomers can be selected to meet these requirements. Examples of two such elastomers include phenylmethyl polysiloxane ($n = 1.54$–$1.55$ at 6328A) and dimethyl polysiloxane ($n = 1.40$–$1.41$ at 6328A) cross-linked to the desired elastomeric state.

Light reflected from original 211 is observed through optical system 212 by scanning driver 210. Light reflected from fluorescent tubes 213 is typical of light suitable for use in this application. Scanning driver 210 scans the original a line at a time from left to right and clocks charge packets down strip 209 corresponding to the information on the original. When the charge packet is stopped by driver 210 at one of the separate individual electrodes 202, a field is set up between grounded common electrode 203 and the one of electrodes 202 having a charge. The light propagating in the waveguide positioned between electrodes 202 and 203 is modulated by the field.

Figure 3:
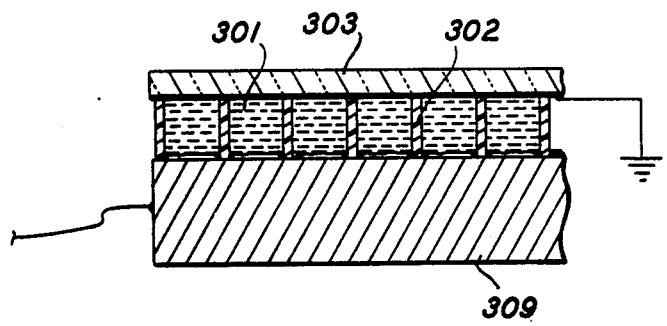
FIG. 3 is a cross-sectional view along 2—2 of FIG. 1 showing, schematically, a portion of the addressing device of the present invention wherein the waveguides are liquid crystals.

Referring more specifically to FIG. 3, there is shown in cross section the addressing portion of the device of the present invention wherein the waveguides 301 are liquid crystal materials. The channels of liquid crystal materials are separated by insulating dividers 302. The channels are enclosed by semiconductor strip 309 which corresponds to strip 109 in FIG. 1 and by grounded common electrode 303.

The device of FIG. 3 is useful with a control means such as that described in connection with FIG. 2.

Useful liquid crystal materials are those which are normally light transmissive and become light scattering in the presence of an electric field. Generally, liquid crystals having positive dielectric anisotropy are useful, although other electrooptically active liquids can also be used.

Any suitable liquid crystal may be used. Typical liquid crystal materials include cholesteric liquid crystals such as derivatives from reactions of cholesterol and inorganic acids; such as, cholesteryl chloride, cholesteryl bromide, cholesteryl iodide, cholesteryl fluoride, cholesteryl nitrate; esters derived from reactions of cholesteryl and carboxylic acids; for example, cholesteryl crotonate; cholesteryl nonanoate, cholesteryl hexanoate; cholesteryl formate; cholesteryl chloroformate; cholesteryl propionate; cholesteryl acetate; cholesteryl linoleate; cholesteryl linolenate; cholesteryl oleate; cholesteryl erucate; cholesteryl butyrate; cholesteryl caprate; cholesteryl laurate; cholesteryl myristate; ethers of cholesteryl such as cholesteryl decyl ether; cholesteryl lauryl ether, cholesteryl oleyl ether; cholesteryl dodecyl ether; carbamates and carbonates of cholesterol such as cholesteryl oleyl carbonate; cholesteryl ethyl carbonate; cholesteryl butyl carbonate; cholesteryl geranyl carbonate; cholesteryl erucate; cholesteryl cetyl carbonate; cholesteryl-p-nonylphenyl carbonate; cholesteryl-2-(2-ethoxyethoxy) ethyl carbonate; cholesteryl-2-(2-butoxyethoxy) ethyl carbonate; cholesteryl 1-2-(2-methoxyethoxy) ethyl carbonate; cholesteryl heptyl carbamate; peptides such as poly-γ-benzyl-λglutamate derivatives of beta sitosterol such as sitosteryl chloride; and active amyl ester of cyanobenzylidene amino cinnamate. The alkyl groups in said compounds are typically saturated or unsaturated fatty acids, or alcohols, having less than about 25 carbon atoms, and unsaturated chains of less than about 5 double-bonded olefinic groups. Aryl groups in the above compounds typically comprise simply substituted benzene ring compounds. Mixtures of such materials and others may also be used.

Typical liquid crystal materials also include nematic liquid crystal materials such as p-azoxyanisole, p-azoxyphenetole, p-butoxybenzoic acid, p-methoxy-cinnamic acid, butyl-p-anisylidene-p-aminocinnamate, anisylidene para-aminophenylacetate p-ethoxy-benzalamino-a-methyl-cinnamic acid, 1,4-bis (p-ethoxy benzylidene) cyclo-hexanone, 4,4'-dihexyl oxybenzene, 4,4'-diheptyloxybenzene, anisal-p-amino-azo-benzene; anisaldazine, n,n'-nonoxybenze-toluidine; anils of the generic groups (p-n-alkoxy-benzylidene-p-n-alkylanilines) such as p-methoxy benzylidene p-n-butylaniline, and p-ethoxy benzylidene p'-n-butylaniline; chlorostilbenes, mixtures of the above and many others.

Typical liquid crystal materials also include smectic liquid crystal materials such as n-propyl-4'-ethoxy biphenyl-4-carboxylate; 5-chloro-6-n-heptyloxy-2-naphthoic acid at temperatures in the range of about 166°–176° C; lower temperature mesophases of cholesteryl octanoate, cholesteryl nonanoate, and other open-chain aliphatic esters of cholesterol with chain length of 7 or greater; cholesteryl oleate; sitosteryl oleate; 4'-n-alkoxy-3'-nitrobiphenyl-4-carboxylic acids; ethyl-p-azoxycinnamate; ethyl-p-4-ethoxybenzylideneaminocinnamate; ethyl-p-azoxybenzoate; potassium oleate; ammonium oleate; p-n-octylloxybenzoic acid; the low temperature mesophase of 2-p-n-alkoxybenzylidenaminofluroenones with chain length of 7 or greater; the low temperature mesophase of p-(n-heptyl) oxybenzoic acid; anhydrous sodium stearate; thallium (1) stearate; mixtures thereof and others.

In addition to the materials listed above, suitable mixtures of electro-optic materials may be used in the present invention. Typical of these mixtures are mixtures of liquid crystal materials, mixtures of cholesteric and nematic liquid crystals, mixtures of liquid crystals and various dyes, mixtures of liquid crystal and emulsifying agents such as Fluorolube, polymers of trifluorovinyl chloride available from the Hooker Chemical Corp., Niagara Falls, New York and dimethyl formamide. Also, racemic mixtures of cholesteric liquid crystals, where the mixture comprises equal strength of right and left-hand optical rotary compounds.

Mixtures of liquid crystals can be prepared in organic solvents such as chloroform, petroleum ether, methylethyl ketone and others, which are typically subsequently evaporated from the mixture thereby leaving the liquid crystalline mixture in a desired location. Alternatively, the individual liquid crystals of the mixture can be combined directly by heating the mixed components above the isotropic transition temperature.

Other suitable optically active, non-mesomorphic materials may be used in the present invention. Typically, such materials include derivatives of alcohols such as l-menthol, 1-linanool, d-mannitol, d-bornel and d-quercitol; derivatives of ketones such as d-camphor, d-3-methylcyclohexanone 1-methone and 1-6-isopropyl-3-cyclohexanone; derivatives of carboxylic acids such as d-citronellic acid, 1-citronellic acid, d-chaulmoogric acid, 1-campholic acid, 1-arabonic acid, d-tartaric acid and 1-ascorbic acid, derivatives of aldehydes such as d-citronellal; derivatives of alkenes such as 1-B-pinane, di-silversterene, and d-limonene; derivatives of amines such as 1,2-methylpiperidine; derivatives of nitriles such as d-mandelonitrile; derivatives of amides such as d-dydrocarbamide; and mixtures thereof.

Other suitable electro-optic materials include mixtures of fine metallic particles such as aluminum in insulating oils; suspensions of opaque plate-like particles such as graphite in oil; and various other materials as disclosed in Donal, Proc. I.R.E., May, 1943, P. 208; and in Marks U.S. Pat. No. 2,543,793.

The above list of materials is not intended to be exhaustive or limiting.

Insulating spacer members 302 which separate liquid crystal waveguides 301 are typically chemically inert, substantially electrically insulating and have appropriate dielectric characteristics. Typical materials include cellulose acetate, cellulose triacetate, cellulose acetate butyrate, polyurethane elastomers, polyethylene, polypropylene, polyesters, polystyrene, polycarbonates, polyvinylfluoride, polytetrafluoroethylene, polyethylene terephehalate and mixtures thereof.

In operation, the addressing and modulating device of the present invention has a great variety of applications. One exemplary application is the line-by-line addressing of an imaging surface by light emanating from a row of parallel waveguides. The waveguides, having light propagating therethrough, are arranged so as to pass through an addressing and modulating device of the present invention. Upon the addressing of each line the device places charge packets in one end of the CCD and clocks the packets to the correct individual electrodes.

Electrodes which contain charges when the clock stops modulate the light propagating in the corresponding waveguide by the mechanism described above. Unmodulated light can then propagate along the remaining waveguides to impinge the imaging surface. The imaging surface is indexed and a subsequent series of charge packets are placed by the CCD control means to modulate the light in the waveguides for the subsequent line on the imaging surface.

In a typical example, the imaging surface is a charged photoconductive surface on which the charge dissipates in the areas struck by light emanating from the unmodulated members of the row of waveguides. The remaining charge is developed in the well known xerographic manner. The use of thermographic imaging surfaces which are responsive to laser light propagating through the unmodulated waveguides is another typical example of an imaging surface.

Figure 4:
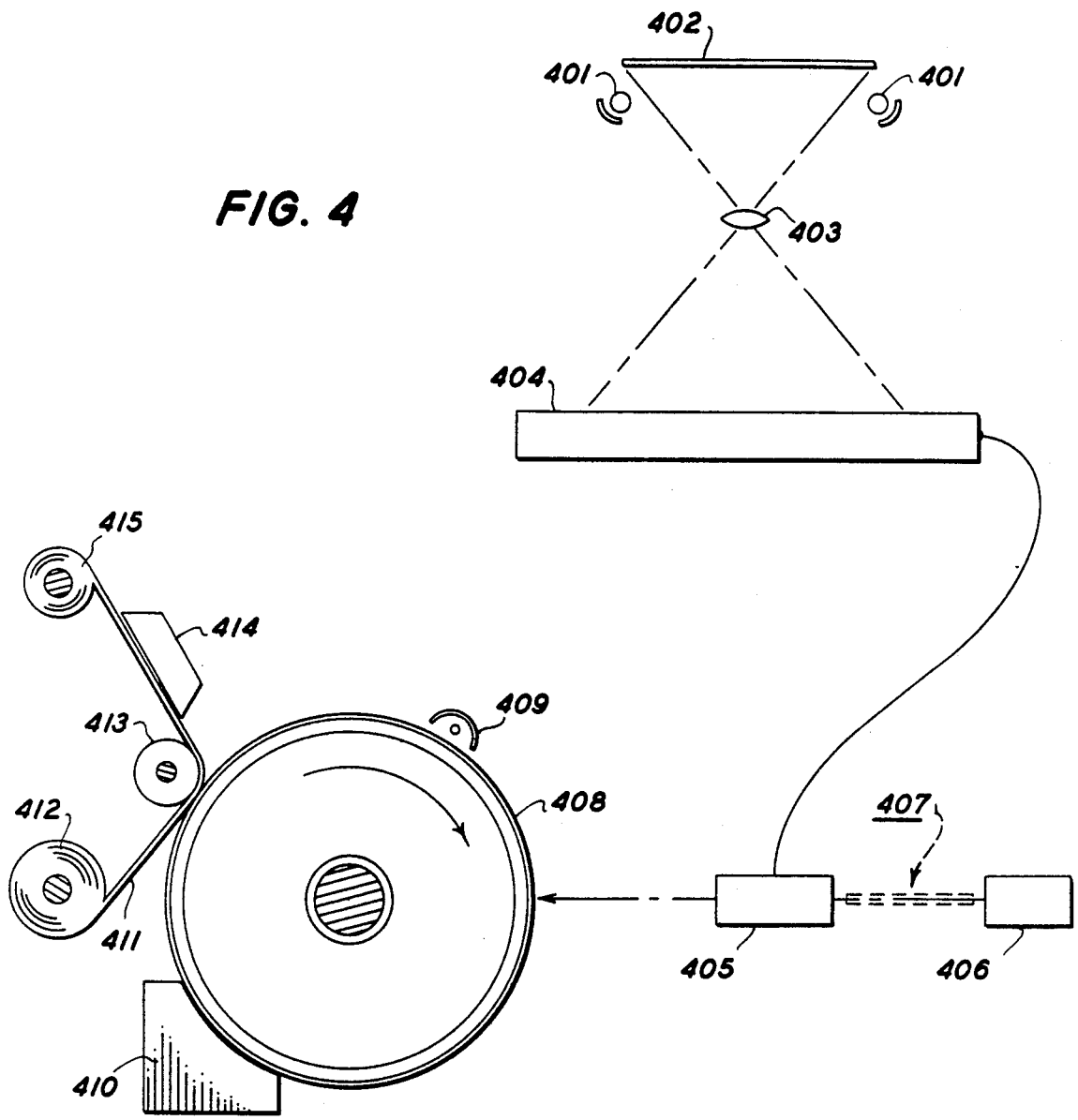
FIG. 4 shows a cross-sectional schematic view of a novel imaging system employing the addressing and modulating device of the present invention.

Referring more specifically to FIG. 4, there is shown schematically and in cross-section an imaging system employing the addressing and modulating device described in FIGS. 1–3.

Light from fluorescent tubes 401 is reflected from original 402 through optical system 403 onto CCD scanning driver 404. Driver 404 scans the original from left to right a line at a time and drives CCD array 405 responsive to the light reflected from the original.

Upon each scan across original 402, driver 404 creates a series of charge packets in array 405 and clocks the packets to a position along the array corresponding to the position of related information on original 402. For example, in one useful mode of operation, driver 404 will create charge packets corresponding to bits of the original which are black (the image area). White (background) bits of the original will cause no charge packet to arise. The charge packets and the areas of no charge are clocked along array 405 to positions which correspond to the related image and background areas of original 402.

Organized light from laser 406 is coupled into waveguide array 407 and is modulated at array 405 as described in connection with FIGS. 1–3. The light, as modulated propagates along waveguide array 407 and strikes charged photoconductive surface 408.

Surface 408 is a cylinder which rotates in the direction shown by the arrow. As it rotates, it is uniformly charged by corona 409 and discharged when struck by light from waveguide array 407. Members of waveguide array 407 which carry light corresponding to the background areas of original 402 will cause surface 408 to be discharged in the light-struck area. Members of waveguide array 407 in which the light has been modulated will not discharge the areas of photoconductor 408 to which they correspond.

As photoconductor 408 moves past waveguide array 407, scanner-drive 404 is indexed to scan a subsequent line. The modulation of light in waveguide array 407 changes with the new scan so as to correspond with the image in the new scan line.

The selective discharging of the uniform charge on photoconductor 408 results in a charge pattern. The charge pattern is developed at developing station 410 by any of the well-known xerographic development means.

In the exemplary embodiment of FIG. 4, the developed image is transferred to paper 411 as it unrolls from supply roll 412 and is pressed against photoconductor 408 by transfer roll 413.

After the developed image is transferred to paper 411, it is fixed thereto at fixing station 414. Xerographic fixing stations are well known in the art. Subsequent to fixing, the paper is rewound on takeup reel 415.

Many variations of the embodiment of FIG. 4 are useful. Well known variations in the xerographic development, transfer and fixing steps may be employed. Alternatively, a thermographic imaging surface can be employed instead of a photoconductive surface. The unmodulated laser light will cause the thermographic surface to turn dark in the areas corresponding to the background of original 402. Other useful variations within the scope of the embodiment of FIG. 4 will be apparent to those skilled in the art.

A method of making and using the addressing and modulating apparatus of the present invention will now be described by way of example by which other useful embodiments and procedures will become clear to those skilled in the art.

EXAMPLE I

A 10 inch long strip of polyethylene material having dimensions of 9 × 0.005 inch is obtained. One thousand, seven hundred and twenty-eight parallel grooves are machined on one of the 9 inch sides. The grooves are on 0.0005 inch centers and have a width of 0.0004 inch and a depth of 0.002 inch.

The open ends of the grooves on either end of the polyethylene strip are covered with glass. The grooves are then filled with methoxy benzylidene-p-n butyl analine liquid crystal material.

A plate of NESA glass is positioned over the grooves to seal and separate them. NESA glass is tin oxide coated glass and is commercially available from Pittsburgh Plate Glass. The NESA glass is positioned with its tin oxide coating against the liquid crystal filled channels. The arrangement is then inverted and the tin oxide layer is grounded.

A cut is made in the ungrooved side of the polyethylene strip to a depth of about 0.003 inch. The cut is made to form a channel across the strip approximately perpendicular to the parallel grooves. The channel exposes the liquid crystal material in each separate groove.

A model 121 Fairchild CCD Array charge-coupled device (CCD) available from Fairchild Semiconductor is placed in the channel. The CCD has 1,728 electrodes plated onto its n-type silicon semiconductor as described in connection with FIG. 1 above. The elecrodes are 0.0005 inch silver circles on 0.0005 inch centers. One of the circle electrodes lies over each of the channels.

The CCD array includes a Faidchild 121 scanner driver which is positioned to observe light reflected from an original substantially as shown in FIG. 2. The scanner driver separates each line across the original into 1,728 bits corresponding to the 1,728 individual electrodes of the CCD array.

Light from a Model 124B 15 miliwat helium neon laser available from Spectra Physics, Mountain View, Ca., is directed onto the glass covered channel ends so that the light propagates through each of the channels. The scanning driver is activated to scan one line of the original image.

The light propagating through the liquid crystal waveguide channels is observed to be blocked in the channels corresponding to the dark areas of the original.

The scanner is indexed and the scan is repeated on the next line of the original. Similar results are observed.

EXAMPLE II

An elastomer waveguide is made as follows:

100 cc of isopropyl ether and 75 g. of conc. HCl are charged into a flask. This charge is heated to 50°–55° C and a feed of 191.0 g. of $\phi MeSiCl_2$ in 100 cc of isopropyl ether is added dropwise to the charge while stirring over 1½ hours.

After addition of the feed is completed, the mixture is stirred for an additional 30 minutes at 50°–55° C and then cooled to 25° C.

This cooled mixture is given a first wash with 150 cc of $NaCl-H_2O$, and the $HCl-H_2O$ bottom layer is siphoned off.

A second and third wash of 150 cc of a 2 percent NaHCO₃—H₂O are given to a slightly alkaline pH.

Several subsequent washes with 150 cc of NaCl—H₂O are given to a neutral pH.

The mixture is then filtered and vacuum stripped to remove the isopropyl ether, resulting in a yield of 117.0 g. of a crude product.

This product is vacuum distilled to produce a mixture of ($\phi$MeSiO)₃, b.p. about 180° C/2mm and ($\phi$MeSiO)₄, b.p. about 237° C/2mm and a total weight of 85.0 g.

Phenylmethyl polysiloxane gumstock containing reactive pendant amine crosslinking sites is prepared as follows:

The following is charged into a beaker:
8.0 g. of the ($\phi$MeSiO)$_x$ cyclics
2.0 g. of ($\phi$Me₂SiO)₄ cyclic tetramer
0.2 g. of ($\Delta$-NH₂ Bu MeSiO)$_x$ cyclics
100 ppm of tetramethyl ammonium silanolate catalyst.

The beaker is sparged with nitrogen and placed in a 95° C vacuum oven at full vacuum. After 3 hours, the temperature is raised to 150° C for 2 hours to decompose the catalyst and to remove fragment molecules. The resulting product is a clear, somewhat sticky gum. This gum is then completely dissolved in benzene at the ratio of 20 weight percent solids to benzene.

2.0 g. of the above product solution is mixed with 0.1 g. of a crosslinked solution of the acetone oxime adduct of toluene-2,4-diisocyanate (5 weight percent in tetrahydrofuran). A UV sensitive curing agent (tetramethyldisiloxane and benzophenone) is added.

A 10 micron layer of the mixture is placed on the conductive side of a NESA glass slide which is 9 inches wide, 10 inches long and 0.25 inch thick. The layer is exposed to an ultraviolet radiation image which comprises a pattern of parallel stripes 0.0004 inch wide on 0.0005 inch centers and extending the length of the slide.

The ultraviolet radiation cures the mixture in an imagewise pattern corresponding to the radiation pattern. After UV exposure and curing, the slide is washed with benzene to remove the uncured mixture. A pattern of elastomeric strips running the length of the NESA glass slide remain.

A Model 121 Fairchild CCD Array available from Fairchild Semiconductor, Mountain View, Ca., is placed across the elastomer strips and substantially perpendicular to them. This CCD has 0.0005 inch circular electrodes at 0.0005 inch centers plated along its n-type silicon semiconductor strip. One such electrode lies substantially adjacent each elastomer strip.

Prism couplers are placed at either end of the elastomer strips and light from a Spectra Physics Model 1248 helium-neon laser is propagated through the elastomers. Light eminating from the exit coupled prisim shows the waveguides to maintain separation of the light while affording useful propagation.

The conductive layer on the glass slide is grounded and the CCD array is connected to a scanning driver as in Example I.

The same tests are accomplished with substantially the same results.

It will be appreciated that other variations and modifications will occur to those skilled in the art upon a reading of the present disclosure. These are intended to be within the scope of this invention.

What is claimed is:

1. A device for individually addressing and modulating light propagating through selected ones of a plurality of optical waveguides, the device comprising:
   a. a common electrode;
   b. a plurality of individual optical waveguides having light propagating therethrough arranged adjacent the common electrode, the waveguides being formed from a material which modulates the propagating light responsive to an electrical field;
   c. a charged-coupled device positioned to intersect the individual optical waveguides, the charge-coupled device including an individual electrode adjacent each optical waveguide opposite the common electrode; and
   d. a control means to cause the charge-coupled device to place a charge at selected ones of the individual electrodes establishing an electrical field between each of the selected ones of the individual electrodes and the common electrode.

2. The device of claim 1 wherein the optical waveguides are made from a light transmissive liquid crystal material which becomes light-scattering in the presence of a field.

3. The device of claim 1 wherein the optical waveguides are made from a deformable material of a given cross-section which physically deforms to change the given cross-section in the presence of an electrical field.

4. A method for individually modulating light propagating through a plurality of individual waveguides which are formed from a material which modulates propagating light responsive to an electrical field, which comprises:
   a. positioning each of the individual waveguides between a common electrode and an individual electrode of a charge-coupled device; and
   b. operating the charge-coupled device to establish fields between selected ones of the individual electrodes and the common electrode.

* * * * *